No. 735,601. PATENTED AUG. 4, 1903.
A. F. SHADEL.
MEANS FOR LIFTING FISH TRAP POTS OR SPILLERS.
APPLICATION FILED SEPT. 2, 1902.
NO MODEL.

WITNESSES:
William P. Smith
Culita Adams

INVENTOR.
Albert F. Shadel
BY Frank C. Adams
ATTORNEY.

No. 735,601. Patented August 4, 1903.

UNITED STATES PATENT OFFICE.

ALBERT FREDERICK SHADEL, OF LOPEZ, WASHINGTON.

MEANS FOR LIFTING FISH-TRAP POTS OR SPILLERS.

SPECIFICATION forming part of Letters Patent No. 735,601, dated August 4, 1903.

Application filed September 2, 1902. Serial No. 121,919. (No model.)

*To all whom it may concern:*

Be it known that I, ALBERT FREDERICK SHADEL, a citizen of the United States of America, and a resident of Lopez, in the county of San Juan and State of Washington, have invented certain new and useful Improvements in Means for Lifting Fish-Trap Pots or Spillers, of which the following is a specification.

My invention relates to improvements in means for lifting fish-nets, and has special reference to a contrivance of this class especially adapted to lift the pots of trap-nets.

Among numerous objects attained by this invention and readily understood from the following specification and accompanying drawings included as a part thereof is the production of a simple and durable portable net-lifting device which embodies essential features of adaptability, utility, and general efficiency.

The above-mentioned and numerous other objects equally as desirable are attained by the construction, combination, and arrangement of parts as disclosed on the drawings, set forth in this specification, and succinctly pointed out in the appended claims.

Figure 2:
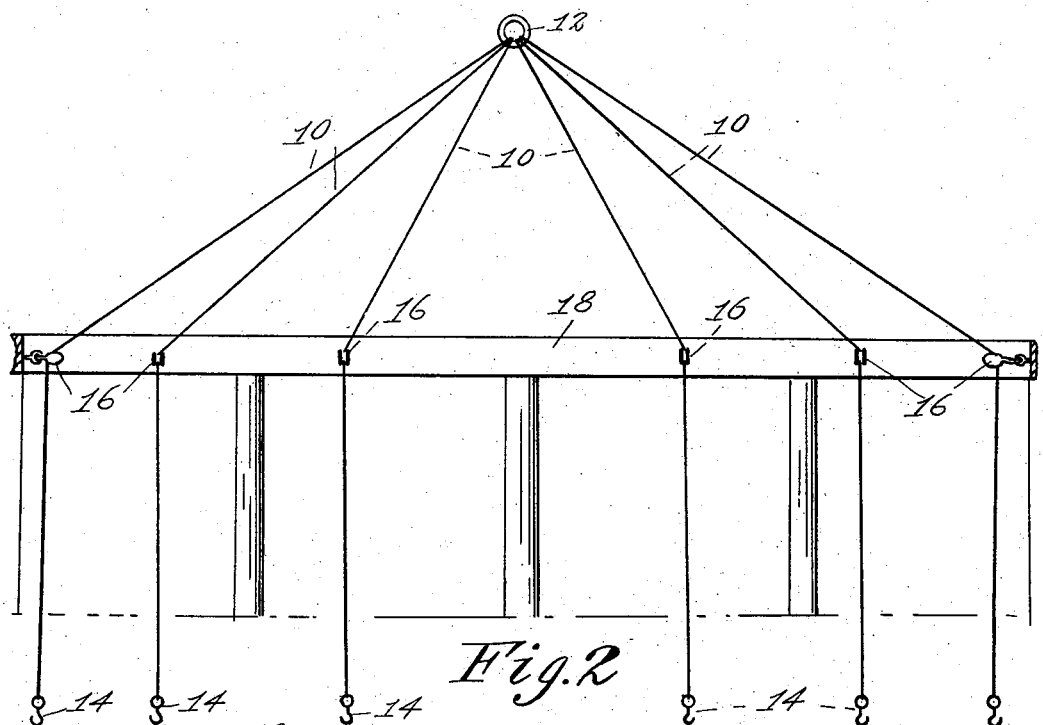
Figure 1:
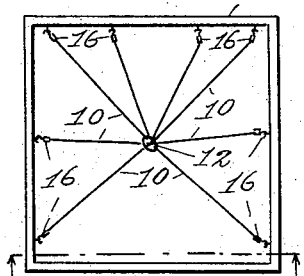
Figure 3:
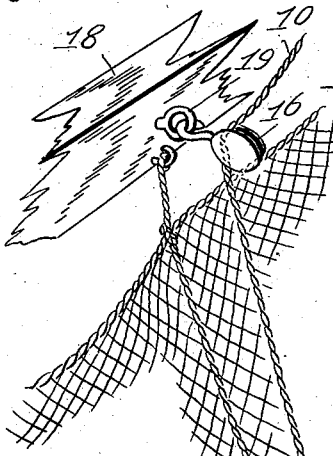
Figure 4:
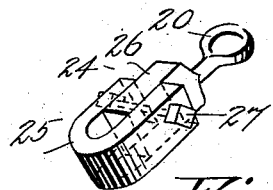

With reference to the drawings filed herewith and bearing similar reference characters for corresponding parts throughout, Figure 1 is a plan view, on small scale, of the frame adapted to support the pot of an ordinary trap-net and indicates my lifter in relative position. Fig. 2 is a vertical sectional view of said frame on large scale, taken on line 2 2 of Fig. 1, viewed as the arrows indicate, and shows the lifter in relative position. Fig. 3 is a perspective view of a portion of the capping of the frame for the pot of a trap-net and indicates a portion of the pot suspended therefrom and one of the draft-lines of the lifter in relative position, and Fig. 4 is a perspective view of one of the eye-clamps adapted to detachably connect the draft-lines to the net.

This invention includes a series of draft-lines, as 10, of any desired plurality, and preferably consisting of sections of rope conforming in length to the distance of lift and suitably connected together at one end by a ring, as 12, or the like, to which one end of each rope is suitably fastened in any desired manner and which is adapted as convenient means for applying the lifting power to each line of the lifter simultaneously. At the free end of each of these lines a hook, as 14, is secured as suitable means by which the lines can be readily detachably connected to the net, and thereby facilitate the use of the lifter and render it capable of raising an extremely deep net without requiring the draft-lines to be of extreme length.

In the present embodiment the draft-lines 10 operate in suitable guides, as 16, suitably supported along the net at separated points to distribute the said lines, so that they will lift substantially equal loads and act in a direct vertical line below the guides, and thereby raise the net more evenly. These guides preferably consist of ordinary snatch-blocks, Fig. 3, and are each provided with a suitable hook by which they are conveniently detachably connected to the net support or frame, as 18, in suitable eyes 19 or the like seated along this frame adjacent the top at the desired points.

As now considered the draft-lines are conveniently detachably connected to the net by engaging the hooks 14 in suitable eyes 20, which are preferably attached to the vertical rib-lines, as 21, of the net, and a plurality of these eyes are arranged along each of these ribs at separated points when the net is of extreme depth, and tie-lines, as 22, are connected to the net adjacent the upper hooks as convenient means for securing the gathered portion of the net in partly-lifted position while the draft-lines are disconnected, lowered, and reattached to the lower eyes to complete the lift. These eyes 20 are preferably arranged on suitable rope-clamps, as 24, each of which consists of a substantially U-shaped clamp 25 of suitable size to receive the rope-rib snugly in the crotch, a shank 26 of less thickness than the diameter of the rope seated between the stems of the clamp and having an eye 20 attached thereto, and a clamping-bolt 27 arranged in suitable apertures formed transversely the stems of the clamp and the shank and adapted to draw said stems toward each other, and thereby cause them to grip the rope.

In the present application of the lifting device the eyes 20 are arranged on three sides only of the capping 18 of the pot-support, Fig.

1, so that the guides 16 can be properly disposed to distribute the draft-lines to gather the netting at these three sides, and thereby throw the fish to the remaining side of the pot as lifted and facilitate their removal.

The application of this device to lift nets of other forms than the one indicated can be readily understood, as it simply involves the placing and supporting of the line-separating guides 16 at suitably-separated points along the upper edge of the net to properly distribute the draft-lines and arranging said lines therein to cause them to converge at the point of application of the lifting power.

This lifting device is simple of construction, durable in use, and has few parts likely to become disarranged. Furthermore, it can be readily placed in position for use and disconnected for transportation from trap to trap, and its operation can be readily understood, as it simply requires the connection of the lower ends of the draft-lines to the net when the lifter is in lowered position, then the application of suitable lifting power to the ring 12, and when the net is of extreme depth the securing thereof when partly lifted by tying the lines 22 to the net-support, when the draft-lines can be disconnected and lowered to the net to complete the lift.

Having thus described my invention, what I claim as new, and desire to secure by Letters Patent of the United States of America, is—

1. A portable net-lifting device, comprising a plurality of draft-lines connected together at one end and adapted to be secured by the opposite ends to a fish-net, and guides adapted to distribute said lines along the net for a vertical lift.

2. A portable net-lifting device, comprising a plurality of draft-lines connected at one end, a net-engaging device at the opposite end of each line and line-distributing guides adapted to guide respective draft-lines for a vertical lift.

3. A portable net-lifting device, comprising a plurality of draft-lines, a ring to which one end of each line is attached, a hook at the opposite end of each line and a block for each line adapted to guide same for a vertical lift.

4. A portable net-lifting device, comprising a plurality of draft-lines connected at one end, a hook at the opposite end of each line an eye-clamp related to each hook and adapted to be secured to the ribs of the net, and a block for each line and means to detachably connect said blocks to the net-support at separated points.

5. A portable net-lifting device comprising a plurality of draft-lines connected at one end, a hook at the opposite end of each line, a plurality of eye-clamps related to each hook and adapted to be secured at separated points on a respective rib of the net, a block for each line, means to detachably connect said blocks to the net-support at separated points and means to support the net in partly-lifted position.

6. In a net-lifting device, the combination with a draft-line, a hook at one end thereof and a rope-guide; of means to detachably connect said guide to the net-support and an eye-clamp adapted to be secured to the net.

7. In a net-lifting device, the combination with a draft-line, a hook at one end thereof and a rope-guide; of means to detachably connect said guide to the net-support and a plurality of eye-clamps adapted to be secured at separated points to the rib-rope of the net and means to support the net in partly-lifted position.

Signed at Lopez, Washington, this 7th day of August, 1902.

ALBERT FREDERICK SHADEL.

Witnesses:
A. L. EASTMAN,
JOHN HULSMAN.